(12) United States Patent
Fear et al.

(10) Patent No.: US 6,592,082 B1
(45) Date of Patent: Jul. 15, 2003

(54) WIRE CHASE RUNG

(75) Inventors: Harold L. Fear, Jackson County, MO (US); Bradley S. Smith, Johnson County, MO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/135,160

(22) Filed: Apr. 30, 2002

(51) Int. Cl.[7] .................................................. F16L 3/00
(52) U.S. Cl. .......................... 248/72; 248/74.2; 248/73; 248/68.1
(58) Field of Search ........................... 248/49, 74.2, 58, 248/65, 67.7, 68.1, 72; 211/26; 361/826

(56) References Cited

U.S. PATENT DOCUMENTS

| | | | | |
|---|---|---|---|---|
| 3,036,801 A | * | 5/1962 | Cemashko | 248/72 |
| 3,486,726 A | * | 12/1969 | Kindorf et al. | 248/72 |
| 3,778,537 A | * | 12/1973 | Miller | 174/138 R |
| D264,682 S | * | 6/1982 | Van Doren | D8/354 |
| 4,538,782 A | * | 9/1985 | Kirschenbaum | 248/68.1 |
| 4,542,871 A | * | 9/1985 | Fortsch | 248/73 |
| 4,559,413 A | * | 12/1985 | Logstrup et al. | 174/163 R |
| 4,790,060 A | * | 12/1988 | Council et al. | 29/525.1 |
| 5,704,571 A | * | 1/1998 | Vargor | 248/58 |
| 5,924,260 A | * | 7/1999 | Austin et al. | 52/698 |
| 6,068,220 A | | 5/2000 | Alrey | 248/49 |
| D438,453 S | * | 3/2001 | Nelson et al. | D8/395 |
| 6,354,542 B1 | * | 3/2002 | Meyer et al. | 248/58 |

* cited by examiner

*Primary Examiner*—Anita King
*Assistant Examiner*—Steven Marsh
(74) *Attorney, Agent, or Firm*—Polster, Lieder, Woodruff & Lucchesi, L.C.; Carl A. Rowold

(57) ABSTRACT

A cable support is provided having a support member and a plurality of rungs. The support member has a center portion and two downward portions that generally define an interior area of the channel. The rungs have a lower retaining section and an upper cable retaining section and are made from a resilient nonconductive material for being detachably secured to the support member.

9 Claims, 3 Drawing Sheets

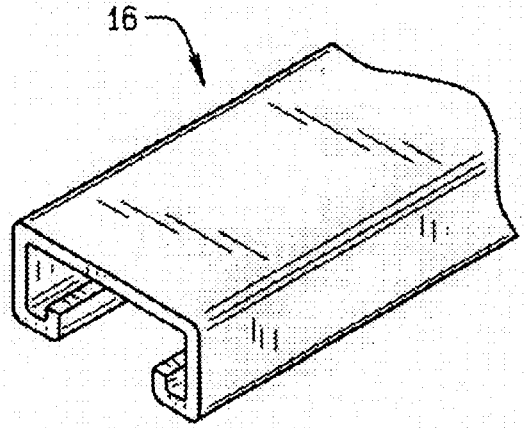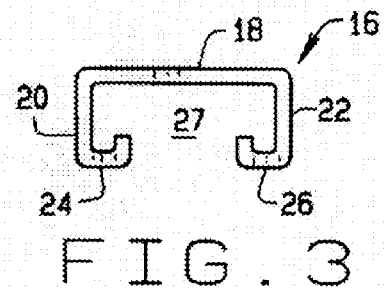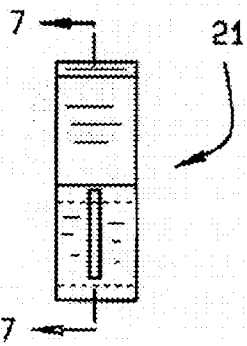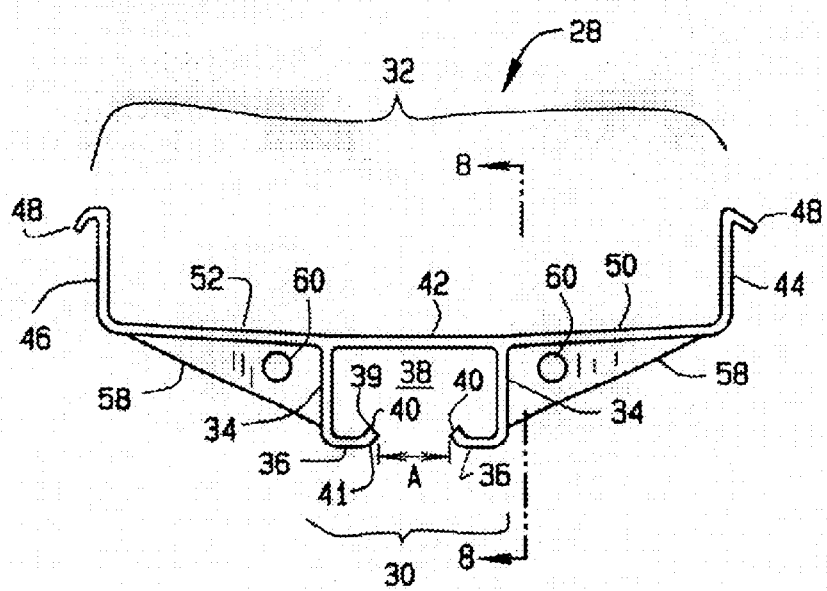

WIRE CHASE RUNG

TECHNICAL FIELD

The present invention relates generally to cable supports. More specifically, it relates to a cable support system having an adjustable number of rungs which are made of a non-conductive material and which are capable of being individually added and removed from the system.

BACKGROUND OF THE INVENTION

In the past, various types of cable supports systems have been used to support cables for connecting or interconnecting computer and telephone communications equipment within a facility. Modern buildings contain extensive cable support systems for this purpose. It is common in these support systems to use non-enclosed cable supports so cables may be easily added, removed or re-routed to support changes in physical layout or systems to be connected. Due to the rapid change in the number, nature and complexity of communication systems, a cable support system that is versatile, reconfigurable and inexpensive is highly advantageous to allow quick modification of cable plants.

Past attempts at cable support systems do not provide the versatility necessary to support a constantly changing cable plant. For example, U.S. Pat. No. 6,068,220 discloses a cable support system in which two parallel side supports are permanently attached to opposite ends of several spaced apart rungs, similar to a ladder laid flat. The assembly is then typically supported from a ceiling or attached to walls above a work area and the cables are then laid across and supported by the rungs. Diagonal rungs support cables routed between these other rungs to reach an area below the cable support. However, the cable support disclosed in the '220 patent does not allow for easy reconfiguration of the cable support system after it has been installed. For example, sections of cable support that need to be changed to intersect with new sections of cable support must be cut to provide for the intersection. This is very time intensive, particularly if a large number of heavy cables on the cable support must be temporarily-supported while the cuts are made. Alternatively, multiple cable supports arranged in different planes may be added. However, this tends to create a labyrinth of cables that are difficult to later add to or remove. Additionally, the cable support system of the '220 patent uses metal side supports and rungs. Constant rubbing of the wires by these metal components can cause chaffing of the cable insulation and short-circuiting of the cable conductors.

Cable support systems are known which implement channels and rungs similar to the present invention. However, these prior art rungs were previously milled from a rigid polyethylene. So made, the rungs could not be added or removed from the channel by resiliently deforming the rung to "snap" it on or off. Instead, the rung had to be installed by sliding it over the end of the channel. This did not allow the rungs to be added or removed after the channel and rung had been put in place and, therefore, was not a satisfactory replacement for prior systems such as that disclosed in the '220 patent.

SUMMARY OF THE INVENTION

Among the features disclosed in this patent application is the provision of a cable support comprising a support member and a plurality of rungs. The rungs are made of a resilient, nonconductive material, each rung having an upper section capable of supporting one or more of the cables and a lower section for detachably securing the rung. The support member is of non-circular shape in section and extends through at least a portion of the facility for supporting the rung. The lower section of each rung is naturally biased to a configuration that engages the outer surface of the support member so the lower portion of a rung can be deformed into shapes that allow it to installed and removed from the support member without the need for other fasteners and without affecting other rungs installed thereto.

BRIEF DESCRIPTION OF THE DRAWINGS

FIG. 2 is a perspective view of a channel according to an embodiment of the present invention;

FIG. 3 is a front plan view of a channel according to an embodiment of the present invention;

FIG. 4 is a side view of a rung according to an embodiment of the present invention;

FIG. 5 is a front view of a rung according to an embodiment of the present invention;

Corresponding reference characters indicate corresponding parts throughout the several views of the drawings.

DETAILED DESCRIPTION OF THE PREFERRED EMBODIMENT

Figure 1:
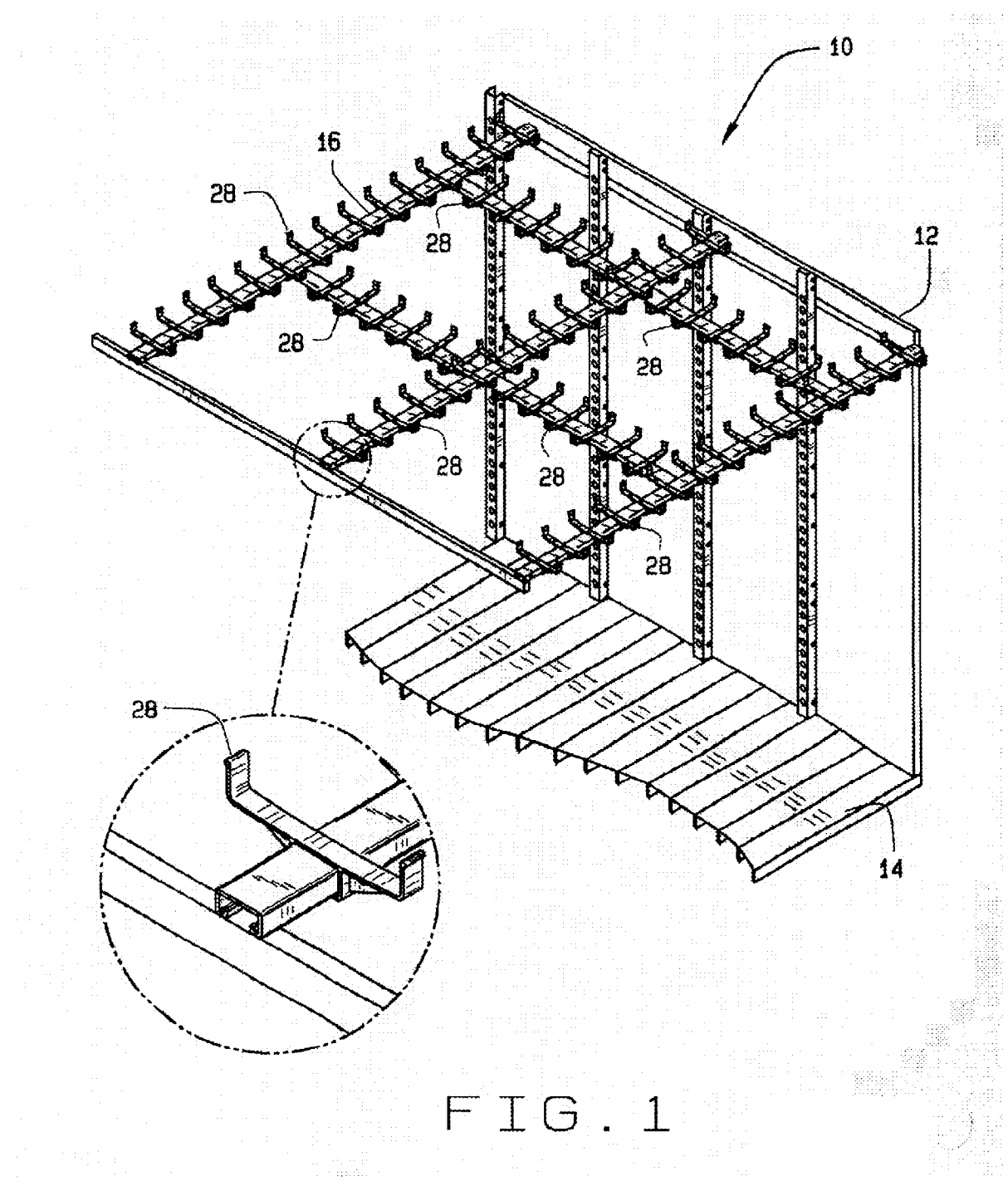
FIG. 1 is a partial perspective view of a structure having a cable support system according to an embodiment of the present invention installed therein
Figure 6:
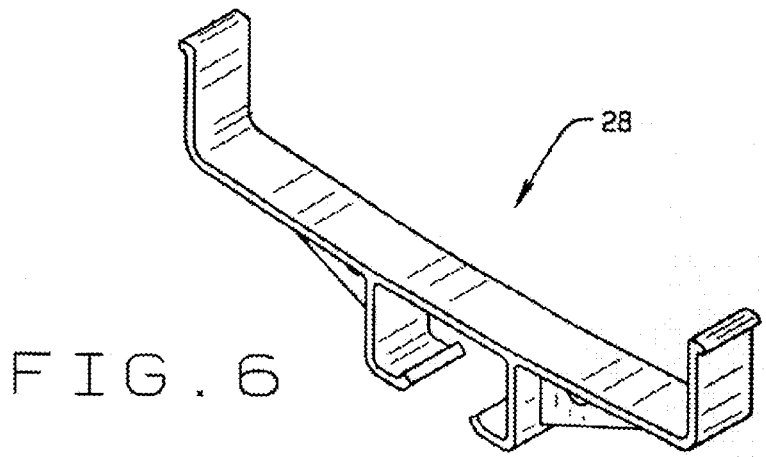
FIG. 6 is a perspective view of a rung according to an embodiment of the present invention.

Referring to FIG. 1, there is provided a building structure 10 comprising walls 12, a floor 14 and a ceiling structure (not shown). Attached to the walls or suspended from the ceiling structure are cable support members 16 formed of a suitable elongate structural beam, such as a channel shown in FIGS. 2 and 3. Each channel 16 is integrally formed as a one-piece unit and comprises a center or top section 18 with respective downward portions 20, 22 extending lengthwise of the channel on either side of the base section. At the bottom of each portion 20, 22 is an inwardly turned portion 24, 26 respectively. These portions first extend toward the opposite downward portion 20, 22 of the channel and then turn upwardly at their inner ends toward the center section 18. These elements together define an interior area 27 of the channel 16. Preferably, the channel 16 is formed from a 12-gauge steel, although other material, metallic or nonmetallic, can be used and may be more suitable for particular environments and applications. A suitable channel is commercially available under the trade designation "Superstrut or Unistrut" from the Thomas & Betts or Unistrut Company.

Figure 7:
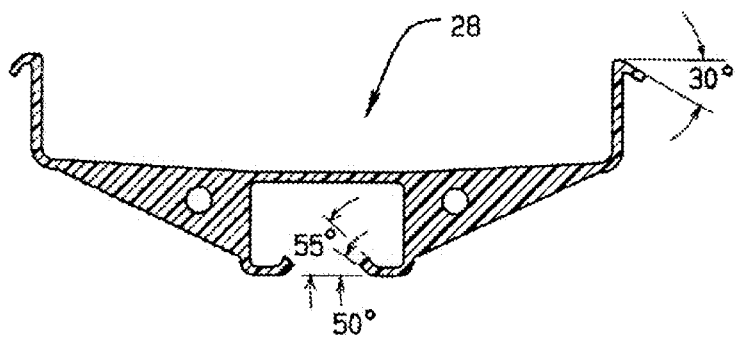
FIG. 7 is a sectional view of a rung taken along line A—A of FIG. 4.
Figure 8:
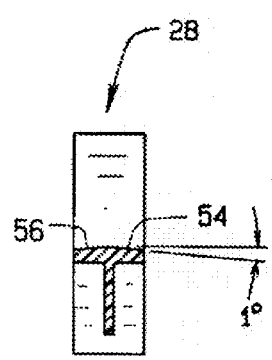
FIG. 8 is a sectional view of a rung taken along line B—B of FIG. 5.

Detachably secured to each channel 16 are a plurality of rungs 28. Referring to FIGS. 4–8, a suitable rung 28 generally comprises a channel retaining section 30 and a cable retaining section 32. Channel retaining section 30 generally comprises two, opposed channel retaining arms 34 at an outer end of each of which is formed an inwardly extending channel retaining arm extension 36. Extensions 36 extend generally toward each other to form an enclosed area 38 in which is received a channel 16. At the inner end of each extension 36 is an upwardly turned and flared portion 40 (as shown in FIG. 5) that extends into area 38. A distance A separates these flared portions, which is less than the width of a channel 16. In a preferred embodiment of the invention, flared portion 40 is thicker at its distal end 39 than its proximal end 41. As such, the edge of flared portion 40 adjacent enclosed area 38 extends at an angle upwardly inclined from horizontal (approximately 55°) and the edge of the flared portion 40 opposite the enclosed area 38 also extends at an angle inclined from horizontal (preferably at a shallower inclined angle, such as 50° as shown in FIG. 7).

Cable retaining section 32 comprises a cable support section 42 having cable support arms 44, 46 attached at opposite ends of the section and extending generally perpendicular to the cable support portion 42 in a direction opposite channel retaining section 30. In the preferred embodiment, the cable support arms 44, 46 comprise flared end 48 that extend from the cable support arms 44, 46 in a direction away from the opposite cable support arm 44, 46 at a downwardly inclined angle (approximately 30° from the horizontal). Also, cable support portion 42 is preferably generally bowed upwardly such that a right side 50 and a left side 52 of the cable support portion extends away from channel retaining section 30 at a slight inclined angle (such as 3°) from the horizontal to maintain cables toward the center of rung 28. Furthermore, referring to FIG. 8, it is also preferred that the upper surface of the cable support portion 42 be of curved configuration in transverse section, such that a front side 54 and a rear side 56 of the cable support portion extend toward channel receiving section 30 at a slight downwardly inclined angle (such as about 1° from the horizontal). This is to prevent scuffing of cables when they are pulled over cable support portion 42.

It is also preferred that rung 28 comprise webbed support portions 58 each attached to both a channel support arm 34 and either the right side 50, or left side 52, of cable support portion 42. The webbed support portions 58 may further define a bore 60 therethrough for hanging objects from rung 28 and/or tying cables to the rung.

Figure 9:
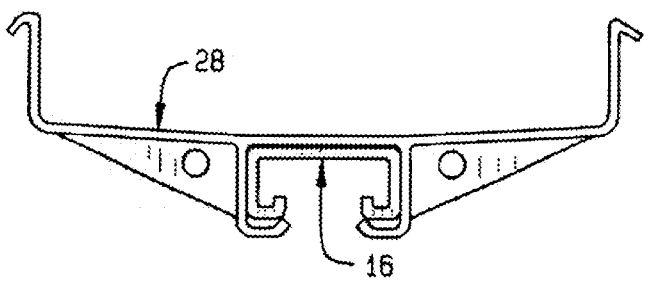
FIG. 9 is a sectional view showing the rung as detachably secured to the channel.

The channels 16 may be attached to, or suspended from, structure 10 in a grid pattern, as shown in FIG. 1, or may be routed from one location to another location within the structure. Rungs 28 are preferably made from a suitable resilient elastomeric material (such as a polyvinyl chloride based polymer) and are attached to channel 16 by resiliently deforming a rung such that the distance A is increased to fit over the outer dimensions of the channel until the extensions 36 and flared portions 40 of the rung engage the inwardly turned portions 24, 26 of the channel, as shown in FIG. 9. This is done by pivoting the rung down around the channel with one extension 36 of the rung in engagement with an aft inwardly turned portion 24, 26 of the channel to move the other extension past the center section of the channel into position at the other inwardly turned portion of the channel 24, 26. In this manner, the rungs 28 may be "snapped" onto channel 16 rather than installed over the end of the channel and slid to a desired location somewhere along the length of the channel. The natural bias of the rung operates to detachably secure the rung onto the channel in position to support the weight of the wires without turning around the channel. Removal of the rung can be achieved by pivoting one side of the rung upwardly around the channel to move the extension of the rung away from the inwardly turned portion of the channel and past the center portion of the channel.

While the support member 16 has been shown and described as being a channel having a horizontal upper or center portion 18 and an open interior area, it is contemplated that it could be of other non-circular sectional shapes. For example, the member could be formed of square or rectangular tubing having a recess or an opening(s) at its bottom or lower side that are engageable with extensions on the rungs to detachably secure the rungs on the member.

Therefore, the present invention provides the benefit of allowing the placement of additional rungs on the channel after it has been put in service and cables routed through the rungs. Additionally, rungs of larger or smaller dimension may be added and removed from the channel after it has been put in service.

It is to be understood that the present disclosure is to be considered only as an example of the principles of the invention. This disclosure is not intended to limit the broad aspect of the invention to the illustrated embodiment.

We claim:

1. A cable support for supporting cables installed in a facility to connect various pieces of electrical equipment together, comprising:

a plurality of rungs made of a resilient, nonconductive material, each rung comprising:
an upper section for supporting the cables comprising a pair of lateral cable support portions at opposite sides thereof of generally equal length and projecting laterally beyond a support member in opposite directions to define an upwardly opening cable retaining section; and
a lower section for detachably securing the rung to the support member comprising a pair of downwardly projecting retaining arms of generally equal length spaced apart by a distance corresponding generally to the width of the support member, with each retaining arm having a laterally inwardly projecting extension defining a central interior space for receiving the support member and terminating in ends separated by a distance that is less than the width of the support member; and,
the support member being of non-circular shape in section, extending through at least a portion of the facility for supporting the rung and comprising a center portion and two downwardly extending portions of generally equal length, each having an inwardly turned portion extending therefrom wherein with the rung positioned on the support member, the support member and the rung are generally symmetrical about a vertical central plane and the lower section of each rung is naturally biased to a configuration that engages the outer surface of the support member so the lower portion of a rung can be deformed into shapes that allow it to be installed and removed from the support member without the need for other fasteners and without affecting other rungs installed thereto and the rung is adapted to balance the load of wires on the rung and direct the wires toward the central vertical plane through the support member for maintaining the rung on the support member.

2. The cable support of claim 1 wherein the extension of each retaining arm comprises a flared portion having an edge adjacent the interior space and extending at an angle inclined upwardly from the horizontal to the edge.

3. The cable support of claim 1 wherein the cable support arms of the rung are generally bowed upwardly such that a right side and a left side of the upper portion extends away from the central retaining section at an angle slightly inclined from the horizontal.

4. The cable support of claim 1 wherein the rung is as readily installed on the support member from either side thereof.

5. The cable support of claim 1 wherein the rung further comprises a cable support arm at the outer end of each lateral cable support portion projecting generally upwardly from its respective lateral cable support portion.

6. The cable support of claim 5 wherein each cable support arm comprises a flared portion that extends from the cable support arm in a direction away from the opposite cable support arm at an angle inclined from horizontal.

7. A cable support for supporting cables installed in a facility to connect various pieces of electrical equipment together, comprising:

a plurality of rungs made of a resilient, nonconductive material, each rung having an upper section for supporting the cables comprising a pair of lateral cable support portions at opposite sides thereof of generally equal length and projecting laterally beyond a support member in opposite direction to define a cable retaining section and a lower section for detachably securing the rung to a support member comprising two downwardly projecting retaining arms, with each retaining arm having a laterally inwardly projecting retaining arm extension;

the support member being of non-circular shape in section and extending through at least a portion of the facility for supporting the rung, with the lower section of each rung being naturally biased to a configuration that engages the outer surface of the support member so the lower portion of a rung can be deformed into shapes that allow it to be installed and removed from the support member without the need for other fasteners and without affecting other rungs installed thereto and wherein with the rung positioned on the support member, the support member and the rung are generally symmetrical about a vertical central plane; and wherein each of the lateral cable support portions of the rung are generally inclined upwardly in opposed directions such that wires laid on the rung are directed toward the central vertical axis for holding the rung on the support member.

8. The cable support of claim 7 further comprising webbed support portions each attached to both a lateral cable support portion and a side of the retaining arm.

9. The cable support of claim 8 wherein the webbed support portions further define a bore.

\* \* \* \* \*